United States Patent [19]

Jackson et al.

[11] 4,313,371
[45] Feb. 2, 1982

[54] PRESSURE COOKER RELIEF VALVE AND PRESSURE COOKERS INCORPORATING SUCH ASSEMBLIES

[75] Inventors: Frederick P. Jackson, Barrowford; Brian Newell, Brierfield, both of England

[73] Assignee: The Prestige Group Limited, London, England

[21] Appl. No.: 905,026

[22] Filed: May 11, 1978

[30] Foreign Application Priority Data

May 27, 1977 [GB] United Kingdom ............... 22613/77

[51] Int. Cl.³ .............................................. A47J 27/08
[52] U.S. Cl. ........................................ 99/337; 99/344; 99/403; 126/388; 220/206
[58] Field of Search ................. 99/344, 337, 403, 410; 126/388, 390; 137/505, 524.11; 220/206, 44, 316

[56] References Cited

U.S. PATENT DOCUMENTS

| | | | |
|---|---|---|---|
| 1,290,378 | 1/1919 | Sibley | 99/403 UX |
| 1,508,817 | 9/1924 | Pfaehler et al. | 220/206 |
| 2,218,188 | 10/1940 | Wittenberg | 99/403 UX |
| 2,254,570 | 9/1941 | Hailey | 220/206 |
| 2,355,150 | 8/1944 | DeSimone | 99/403 UX |
| 2,462,287 | 2/1949 | Richeson et al. | 220/206 X |
| 2,472,451 | 6/1949 | Whitney | 126/388 X |
| 2,515,879 | 7/1950 | Korn | 99/337 X |
| 2,540,583 | 2/1951 | Ives | 126/388 UX |
| 2,917,988 | 12/1959 | Harris | 99/327 |
| 3,483,982 | 12/1969 | Nelson | 99/344 UX |
| 3,610,133 | 10/1971 | Mies, Jr. et al. | 99/337 |
| 3,973,694 | 8/1976 | Tess | 220/206 |

FOREIGN PATENT DOCUMENTS 2305039 8/1974 Fed. Rep. of Germany ...... 126/389

*Primary Examiner*—Harvey C. Hornsby
*Assistant Examiner*—Arthur O. Henderson
*Attorney, Agent, or Firm*—Diller, Ramik & Wight

[57] ABSTRACT

A pressure cooker the casing thereof carrying a pressure relief valve assembly comprising a relief valve having a valve member and a valve seating one of which acts against the other under pressure of biasing means to close a valve port opening into the interior of the cooker and a timer which can be preset to act on an operating member after a predetermined time period, said timer having an actuating member which moves to engage and move said operating member in a substantially linear direction, and said operating member being mechanically connected to means for relieving the pressure of the biasing means.

22 Claims, 5 Drawing Figures

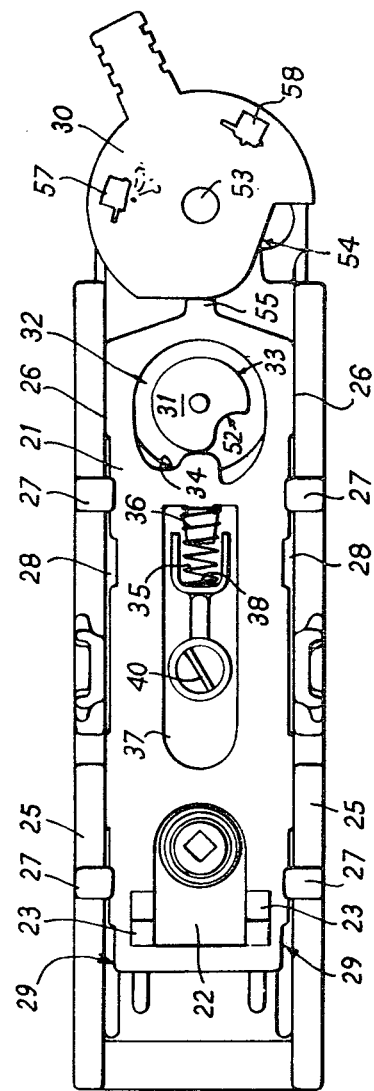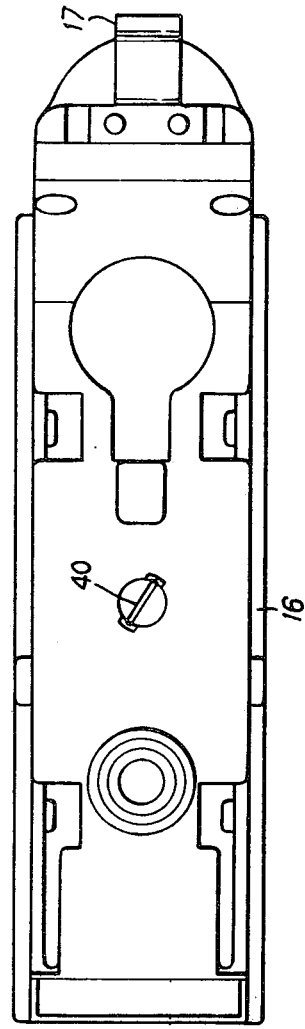
FIG. 3
FIG. 4

PRESSURE COOKER RELIEF VALVE AND PRESSURE COOKERS INCORPORATING SUCH ASSEMBLIES

The invention relates to a pressure cooker provided with a relief assembly. According to the present invention a pressure cooker has a body portion or lid thereof carrying a pressure relief valve assembly comprising a relief valve having a valve member and a valve seating one of which acts against the other under pressure of biasing means to close a valve port opening into the interior of the cooker, and a timer which can be preset to act on an operating member to relieve the pressure of the biassing means and/or give an audible warning after a predetermined time period.

The timer can thus be used to provide a predetermined period of cooking under pressure, the timer then acting to relieve the pressure within the cooker itself and if desired give an audible warning when pressure is to be released.

The timer mechanism can be of any convenient kind, for example electrical, but is preferably operated by clockwork.

The operating member can be used to open the valve in many ways but in a preferred construction the operating member moves in a substantially linear direction and/or in a single plane and actuates means for relieving the pressure of the biasing means.

Thus, the operation of the valve can be similar to the means described in the Applicant's co-pending British patent application No. 22612/77 filed on the same day as the present Application.

Utilising this kind of apparatus therefore the means for relieving the pressure may comprise a wedge which is moved beneath the biasing means by means of the operating member and the wedge can be carried on the operating member itself.

With this construction the operating member can be in the form of a flat plate on which the wedge is formed.

Conveniently movement of the operating member can be controlled by a cam surface which is caused to move by the timer and thus the timer may have a spindle which revolves and to which a timer member which carries the cam surface is connected.

Preferably the operating member is resiliently biased towards the cam surface.

In one preferred construction the biasing means on the relief valve are provided by a weight and additional weights can be provided to vary the biasing pressure if desired.

A convenient construction of valve is described and claimed in the Applicants' co-pending UK Patent Specification No. 30040/76 filed on the June 19, 1976.

Preferably the relief valve is located in a housing having a gas escape opening through which gas escaping through the valve is directed and the timer can also be located in the housing with an operating part thereof projecting therefrom.

If desired control means can be incorporated for opening and closing the valve independently of the timer.

Selector means can also be included for preventing the timer activating the operating member after the timer has been set so that the timer merely provides an audible warning, and these selector means may conveniently be provided by the control means.

In another arrangement means can be included for closing the valve independently of the timer operation.

The invention can be performed in many ways but one embodiment will now be described by way of example and with reference to the accompanying drawings in which:

FIG. 3 is a plan view of the operating member and its associated parts,

FIG. 4 is a plan view from beneath of a base plate,

Figure 1:
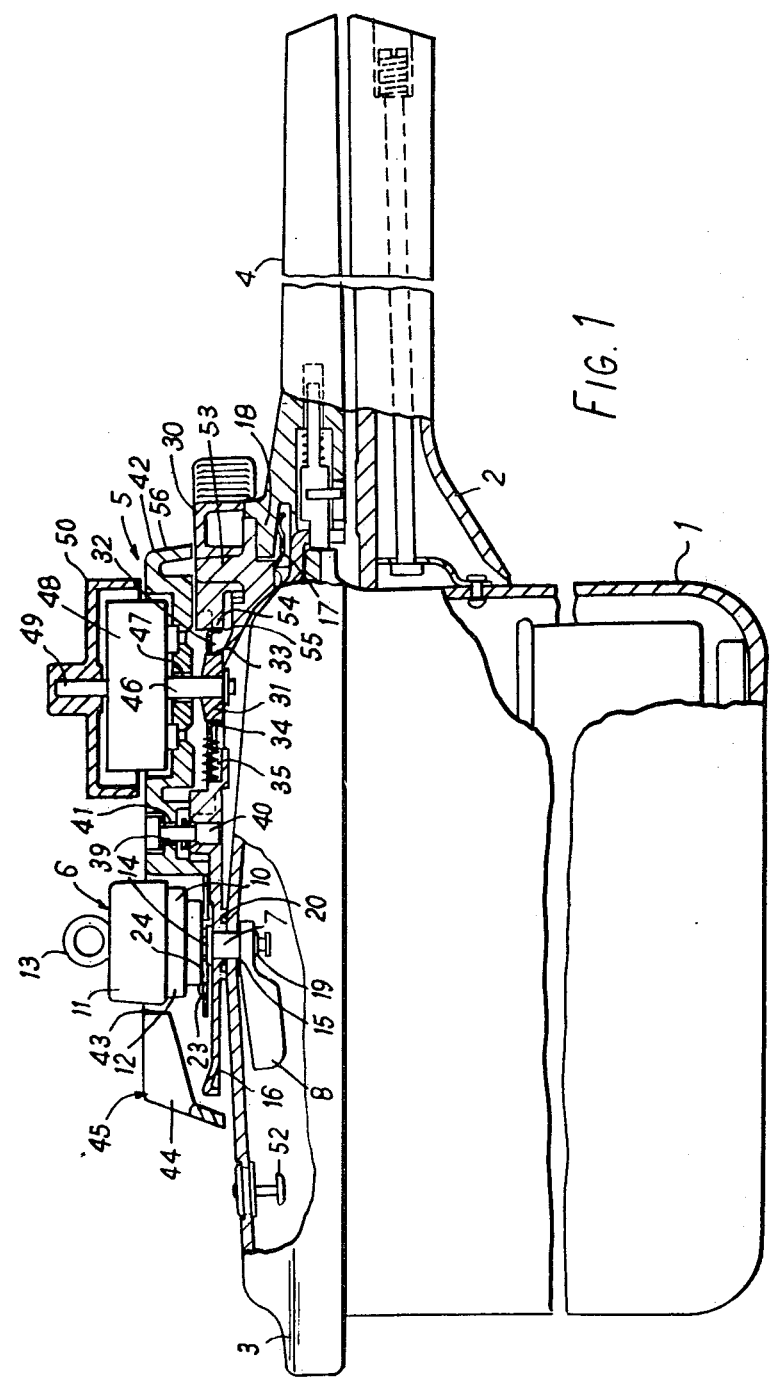
FIG. 1 is a part cross-sectional side elevation of a pressure cooker incorporating the present invention.

As shown in the drawings a pressure cooker comprises a main body portion indicated by reference numeral 1 which has a handle 2. A lid 3 is arranged to clamp onto the body portion 1 and has a handle 4 which is arranged to be in alignment with the lower handle 2 when the lid is in the closed position. A pressure relief assembly indicated generally by reference numeral 5 is provided on the lid 3 and has a relief valve indicated generally by reference numeral 6 which is located at the centre of the circular lid 3.

The valve 6 is of known type and has a seating 7 held in position by a wing nut 8 within the lid 3. A port 9, extends through the seating 7 and this can be closed by a valve member provided by a needle (not shown). The upper end of the needle is fixed to a lower weight 10 on which are carried two further weights 11 and 12. The arrangement is such that the upper weight 11 can be removed to allow removal of the lower weight 12 and it can then be replaced thus allowing the pressure of the biasing means which are provided by the weights to be varied. As mentioned above this valve is of known kind. A cover (not shown), made from a plastics material, can be provided to surround the weights and knob 13 is connected to the lower weight 10 to allow for removal when adjusting weights or cleaning.

If desired the construction of this valve could be as set forth in the Applicants' co-pending British patent application No. 30040/76.

In use the appropriate weights 11 and 12 are provided on the lower weight 10 and the weights maintain their biasing pressure until the pressure within the pressure cooker is such that it is sufficient to lift the weights thus lifting the needle (not shown) and allowing the pressure to escape through the port 9 and thus the desired temperature/pressure conditions are maintained in the vessel.

Figure 5:
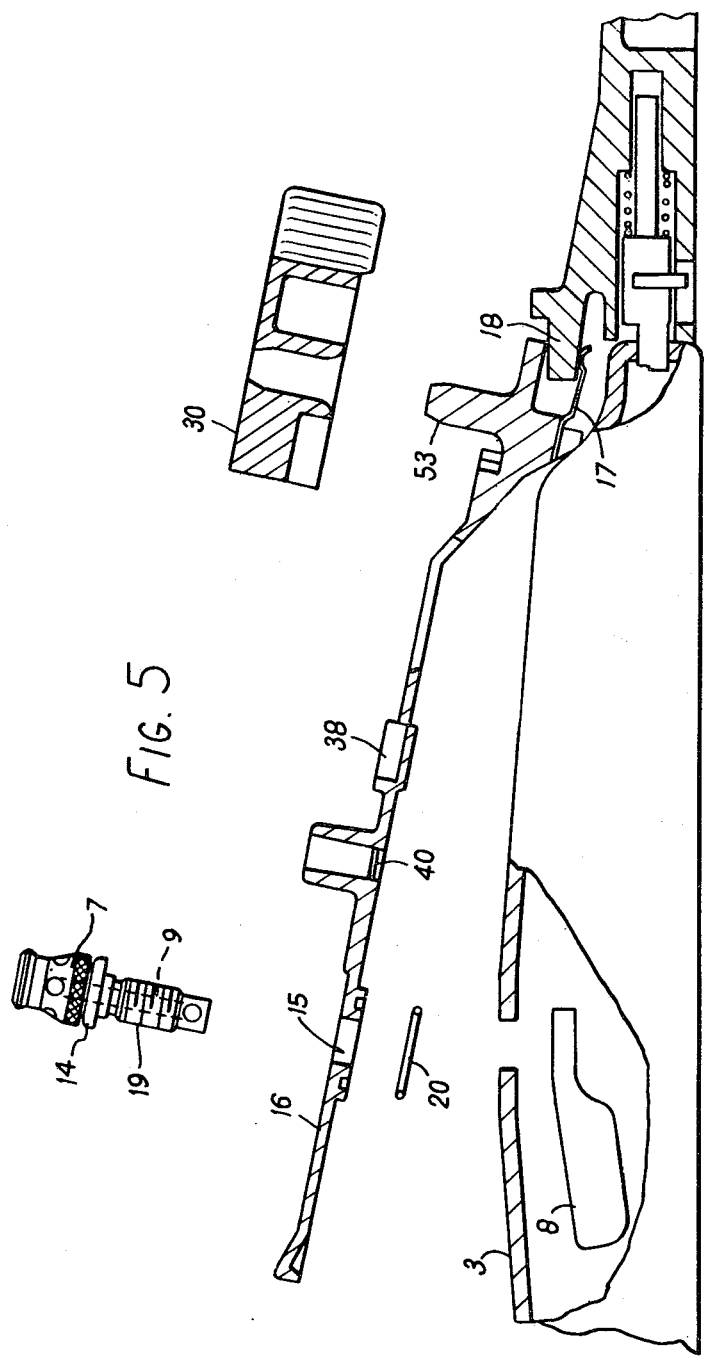
FIG. 5 is a part sectional view of part of the assembly.

The valve seating 7 has a flange 14 which overlaps the edges of an opening 15 provided in a base plate 16 which is most clearly shown in FIGS. 3, 4 and 5. This base plate 16 extends to the outer edge of the lid 3 where a retaining spring 17 (see FIGS. 1 and 5) attached thereto engages beneath a lip 18 provided on the handle 4. The plate 16 is held in position by the wing nut 8 engaging a threaded portion 19 on the valve seating 7 an 'O' ring 20 being provided between the plate 16 and the lid 3 to ensure a sealing fit. This base plate 16 therefore provides a secure base for apparatus for controlling the relief valve. Located above the base plate 16 is an operating member provided by a slider plate 21 which has an opening 22 which surround the valve seating 7 and which is of elongated shape to allow movement relative thereto. A wedge 23 is formed in the plate on each side of the opening 22 and they are shaped so that if the plate 21 is moved to the right, as shown in the drawings, the wedges 23 will engage beneath the lower surface 24 of the weight 10 of the valve and thus cause the weight and its associated valve needle to lift and tilt, thus opening the valve port to atmosphere. The plate 21 is carried in a trough in the base plate 16, this trough being formed by upwardly projecting flanges 25 which, for sake of clarity have been omitted from FIG. 1 and FIG. 5 of the drawings. The side edges 26 of the slider plate 21 are thus guided by these flanges 25 and in order to retain the plate against upward movement four inwardly projecting lugs 27 extend inwardly over the side edges 26. In order to allow the plate to be removed side edges 26 are notched at 28 and cut away at 29 so that removal of the plate can be effected by sliding it to the right, as shown in the drawings, and lifting it off upwardly when the lugs 27 are aligned with the notches 28 and the cut aways 29. As shown in FIGS. 1 and 3 of the drawings movement of the plate to the right is prevented by a manual operation lever 30 the operation of which will be described hereinafter but it will be observed that the lever can be moved to a position in which it is inoperative on the plate 21.

In order to control the plate 21 an angularly movable element is provided in the form of a disc like timer member 31 which is located in an opening 32 in the plate. The side wall of the timer member 31 is provided with a cam surface 33 which bears against a cam ear 34 in the wall of the opening 32. In order to maintain the cam ear 34 against the cam surface a compression spring 35 is provided one end of which is located on a spigot 36 provided in an opening 37 which is most clearly shown in FIG. 3. The other end of the spring is located in a blind groove 38 formed in the base plate 16 which also carries a boss adapted to receive a securing pin 39, the boss having an engagement rod 40 onto which the pin can latch by a quarter turn to provide a twist and lock fastener of the well known Dzuz fastener type. This pin is carried and retained in an opening 41 in a housing 42 which is made from a plastics material and extends over the base plate 16 and the slider plate 21. The relief valve weights 10, 11 and 12 project through an opening 43 in the housing and part of the wall of the opening 43 is cut back and formed with ribs 44 to provide a steam or gas escape opening 45 in the end of the housing. A timer spindle 46 on which the timer member 31 is mounted extends through a further opening 47 in the housing to a clockwork timer indicated by reference numeral 48. A winder spindle 49 leads from the timer to an operating control knob 50 mounted above the upper part of the housing 42.

The timer 48 is wound up by turning the control knob 50 through an appropriate angle and the arrangement is such that when this occurs the timer member 31 is similarly rotated the slope of the cam surface being such that it causes the slider plate 21 to move to the left to the position shown in FIG. 1, that is with the wedges 23 clear of the lower surface 24 of the lower weight 10. The timer member 31 slowly rotates under the action of the timer 48 its cam surface 33 bearing against the cam ear 34 on the slider plate 21 so that the wedges are held in the position shown. After a predetermined time period the timer member 31 will have rotated sufficiently to allow the ear 34 to enter a niche 52 in the cam surface and the slider plate 21 then moves to the right under the action of the springs 35 thus forcing the wedges 23 beneath the surface 24 and tipping the weight 10 to cause the valve needle to open. The valve will remain open in this position until the timer is again energised by being wound up which causes the timer member 31 to again revolve to a position in which the cam ear 34 is on the cam surface 33 and the plate 21 is moved to the left allowing the wedges 23 to move away from the weight 10 and the needle valve to seat.

The timer 48 includes a bell which is arranged to produce an audible warning shortly before the valve is opened thus alerting the user of the cooker that the cooking cycle is complete.

In order to reduce friction between the slider plate 21 and the base plate 16 the upper surface of the base plate is provided with bearing projections (not shown).

In the arrangement shown in the drawings an emergency relief valve 52 is also provided in the lid.

It will be appreciated that when the needle valve (not shown) is opened steam will escape through the valve port 9 and will either pass through the gas escape opening 45 so that it is directed away from the handle of the cooker or escapes round the valve itself and through the opening 43 in the housing 42, that is, upwardly, so that the steam is dispersed to the maximum extent.

Figure 2:
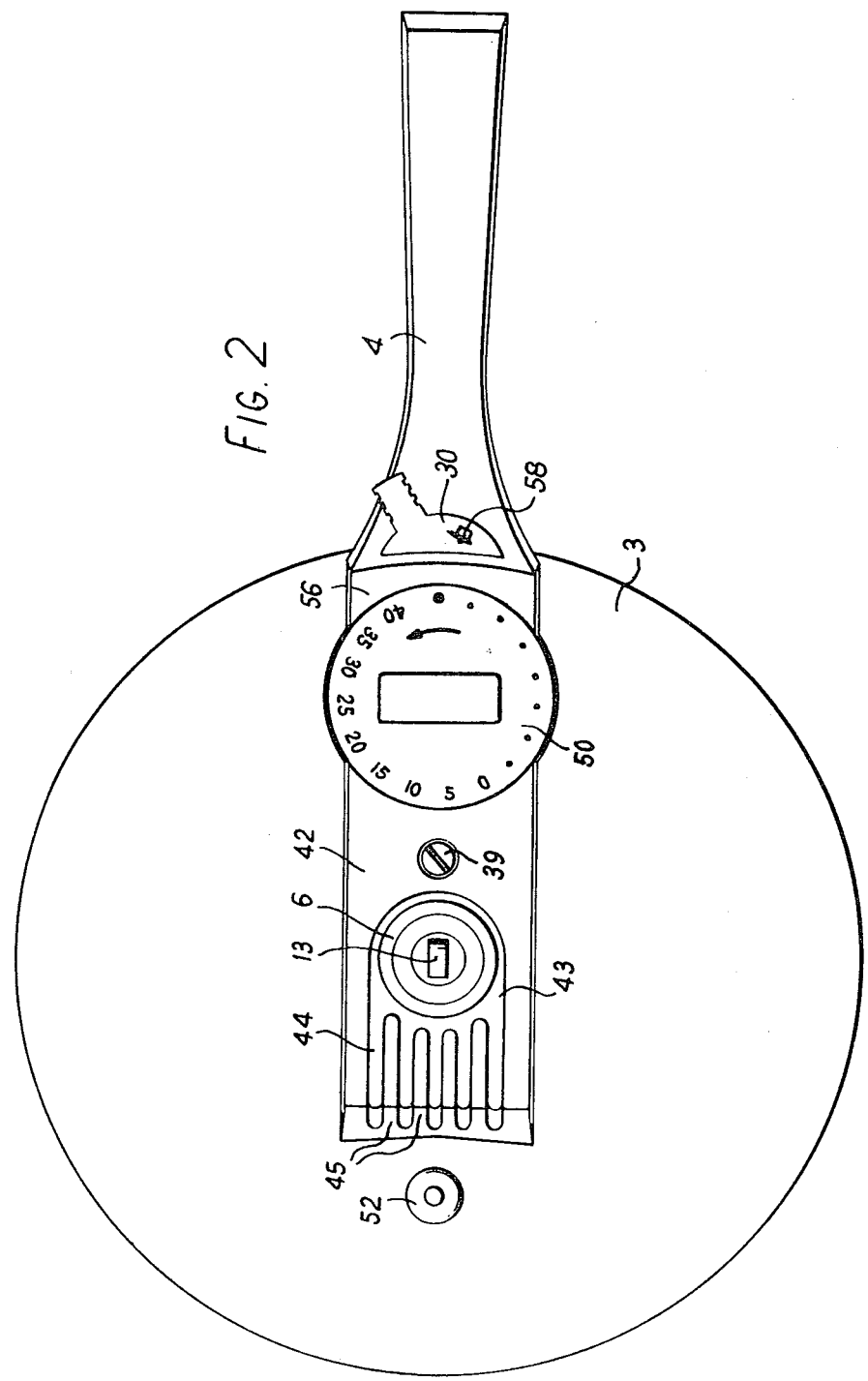
FIG. 2 is a plan view of the assembly shown in FIG. 1

As shown in the drawings, means for manually operating the needle valve can also be incorporated and these means can also act as control selector means for preventing the timer 48 activating the plate 21 after the timer has been set so that the timer merely provides an audible warning. These means can therefore act as manual operating means for the valve and they are provided by the selector device formed by the manual operation lever 30. The lever 30 is rotatably mounted on a spindle 53 provided on the base plate 16. The lever has a cam surface 54 the lower part of which can engage a downturned lug 55 on the end of the slider plate 21 when biased towards the lever by the spring 35. The lever is held in position on the spindle 53 by the end portion 56 of the housing which overlaps it. The cam surface 54 is carried on an enlarged portion of the lever part of which projects beyond the housing, as is most clearly shown in FIG. 2 and this projecting portion carries indicea 57 and 58 to indicate an operative position in which the valve is open (57) and a closed portion (58). With the timer operating and the various parts in the position shown in FIG. 1 and FIG. 3 the lever 30 is in the closed position, with the cam surface 54 resting against the lug 55. Thus, when the timer member 31 reaches the position in which the valve is allowed to be opened under the pressure of the spring 35 acting on the plate 21 this movement cannot take place because it is blocked by the lever 30. The timer bell will however ring and thus alert the user. This particular sequence is desirable for "cooling in air" recipes. With this type of recipe it is desirable to be able to allow the contents of the cooker to cool without rapidly releasing the pressure. The timer in this instance is therefore merely used to give an audible warning when a predetermined time of cooking has elapsed. This lever 30 can also be used for allowing pressure to build up prior to setting the timer for the cooking time. Thus with the parts in the position in which the lug 34 is in the niche 52 and the valve is open, movement of the control selector lever 30 to the closed position causes the cam surface 54 to move against the lug 55 and force the plate 21 to the left against the action of the spring 35 thus moving the wedges 23 out of contact with the weight 10 allowing the valve to close. When it is desired to then apply the timer it is merely necessary to rotate the timer control knob 50 to the desired setting and return the control selector lever 30 to the operative open position in which the cam surface 54 is out of contact with the lug 55 thus enabling the valve to open when the timer has completed its run.

This manual control arrangement is of the kind shown in the Applicants' co-pending British patent application No. 22612/77 filed May 27, 1977.

For normal use it is necessary to be able to dismantle the assembly for cleaning and in order to do this the weight 10 with its valve needle (not shown) is first removed from the valve seating 7. The housing 42 is now separated from the base plate by undoing the securing pin 39 and the removal of the housing enables the lever 30 to be lifted from the spindle 58. The slider plate 21 can now be moved to the right until the notches 28 and cut out 29 are aligned with the lugs 27 and it too can be removed. The wing nut 8 is then undone which allows the valve seating 7 to be removed, as is shown in FIG. 5, which enables the base plate 16 to be taken from the lid, again in the manner indicated in FIG. 5. The various parts can now be cleaned as required and assembly can take place in the reverse order.

In another alternative construction (not shown) a hold position can be incorporated in the clockwork timer so that, for example, the timer is moved to its maximum rotational position or to tis minimal position and although this causes the valve to be closed the timer does not start a timing movement. The arrangement could be such that timing movement is achieved by subsequently moving the timer to a desired time position Thus the timer can be used as a hold control device to allow pressure build up prior to setting the receipt time and again the timer could be moved to the hold position after the bell has operated for use with "cooling in air" recipes, or again the timer could be moved to the hold position at any time during cooking if an automatic pressure release is not desired.

In the embodiment described above the relief valve assembly is carried on the lid of the cooker but it will be appreciated that in an alternative construction (not shown) the mechanism could be provided on the main body 1 of the cooker and parts of the assembly could be incorporated in the handle.

What is claimed is:

1. A pressure cooker the casing thereof carrying a pressure relief valve assembly comprising a relief valve having a valve member and a valve seating defining a valve port opening into the interior of the cooker, said valve port having an axis, means for biasing said valve member against said valve seating to close said valve port under the pressure of said biasing means, timer means which can be preset for acting on an operating member after a predetermined time period, said operating member being mounted for relative reciprocal motion in opposite first and second linear directions generally normal to said valve port axis, said timer means having an actuating member which moves to permit movement of said operating member in a first of said linear directions, said operating member being mechanically connected to means for relieving the pressure of the biasing means, and said pressure relieving means being a wedge carried by said operating member movable beneath said biasing means by movement of said operating member in said first direction to lift said biasing means and open said cooker interior to atmosphere through said valve port.

2. A pressure cooker as claimed in claim 1 in which the timer means is operated by clockwork.

3. A pressure cooker as claimed in claim 1 in which the operating member is in the form of a flat plate on which the wedge is formed.

4. A pressure cooker as claimed in claim 3 in which movement of the operating member is controlled by a cam surface which is caused to move by the timer means.

5. A pressure cooker as claimed in claim 4 in which the timer means has a spindle which revolves and to which a timer member which carries the cam surface is connected.

6. A pressure cooker as claimed in claim 4 in which the operating member is resiliently biased towards the cam surface.

7. A pressure cooker as claimed in claim 6 in which the biasing means on the relief valve are provided by a weight.

8. A pressure cooker as claimed in claim 7 in which an additional weight is provided to vary the biasing pressure.

9. A pressure cooker as claimed in claim 8 in which the relief valve is located in a housing having a gas escape opening through which gas escaping through the valve is directed.

10. A pressure cooker as claimed in claim 9 in which the timer means is also located in the housing with an operating part thereof projecting therefrom.

11. A pressure cooker as claimed in claim 10 including control means for opening and closing the valve independently of the timer means.

12. A pressure cooker as claimed in claim 10 including selector means for preventing the timer means activating the operating member after the timer has been set so that the timer means merely provides an audible warning.

13. A pressure cooker as claimed in claim 12 when dependent on claim 16 in which the selector means are provided by the control means for opening and closing the valve.

14. A pressure cooker as claimed in claim 12 including means for closing the valve independently of the timer means operation.

15. A pressure cooker comprising a casing carrying a pressure relief valve assembly, said pressure relief valve assembly including valve means for relieving pressure within said casing, settable timing means for operating said valve means after a predetermined time period, means mechanically connecting said timing means to said valve means, said mechanical connecting means including a linearly reciprocal operating member, said timing means including a rotatable output member responsive to the setting of said timing means, means responsive to rotation of said output member to effect linear motion of said operating member, a weight for biasing said valve means to a position closing fluid communication between said casing and atmosphere, said operating member being operative upon linear motion thereof in a first direction to move said weight and said valve means and thereby open fluid communication between said casing and atmosphere, said valve means including a valve port closed by a valve member under the influence of said weight, said valve port having an axis disposed generally normal to said first direction of operating member movement, and said operating member carrying a wedge movable beneath said weight during the movement of said operating member in said first direction to move said weight generally along said valve port axis and thereby open said casing to atmosphere.

16. The pressure cooker as defined in claim 15 wherein said rotation responsive means includes spring means for normally biasing said operating member in a direction toward said output member.

17. The pressure cooker as defined in claim 16 including wedge means carried by said operating member for raising said weight when said operating member is moved in said first direction to open fluid communication between said casing and atmosphere.

18. The pressure cooker as defined in claim 16 wherein said operating member includes a recess receiving said rotatable output member, and said operating member includes ear means projecting into said recess for engaging in a notch of said rotatable output member to permit movement of said operating member in said first direction.

19. A pressure cooker comprising a container body and a removable lid collectively defining an interior chamber adapted to be pressurized under the effects of elevated temperature, a pressure relief valve assembly carried by said lid, said pressure relief valve assembly including a valve member and a valve seating defining a port opening through said lid into said interior chamber, said valve port having an axis, means for biasing said valve member against said valve seating to close said valve port under the pressure of said biasing means, timer means which can be preset for acting on an operating member after a predetermined time period, said operating member being mounted for relative reciprocal motion in opposite first and second linear directions generally normal to said valve port axis, said timer means having an actuating member which moves to permit movement of said operating member in a first of said linear directions, said operating member being mechanically connected to means for relieving the pressure of the biasing means, said pressure relieving means being a wedge carried by said operating member movable beneath said biasing means by movement of said operating member in said first direction to lift said biasing means and open said cooker interior to atmosphere through said valve port, said timer means having an actuating member which moves to engage and moves said operating member in a substantially linear direction, said operating member being mechanically connected to means for relieving the pressure of the biasing means, and said pressure relieving means being a wedge carried by said operating member movable beneath said biasing means by movement of said operating member to move said biasing means generally normal to said valve port axis and open said interior chamber to atmosphere through said valve port.

20. The pressure cooker as defined in claim 19 wherein said wedge is positioned between said biasing means and said lid.

21. The pressure cooker as defined in claim 20 wherein said biasing means biases said valve member in a first direction and said linear direction of movement of said operating member is generally normal to the biasing direction of said biasing means relative to said valve member.

22. The pressure cooker as defined in claim 21 wherein said biasing means is a weight.

* * * * *